(12) United States Patent
Miyazaki

(10) Patent No.: US 7,386,269 B2
(45) Date of Patent: Jun. 10, 2008

(54) IMAGE FORMING APPARATUS, IMAGE PROCESSING METHOD, PROGRAM AND RECORDING MEDIUM

(75) Inventor: Satoshi Miyazaki, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 351 days.

(21) Appl. No.: 11/081,985

(22) Filed: Mar. 16, 2005

(65) Prior Publication Data

US 2005/0207812 A1    Sep. 22, 2005

(30) Foreign Application Priority Data

Mar. 18, 2004   (JP)   ............... 2004-077918

(51) Int. Cl.
G03G 15/00    (2006.01)
G03G 21/00    (2006.01)
B65H 45/20    (2006.01)
H04N 1/387    (2006.01)

(52) U.S. Cl. ...................... 399/405; 399/381
(58) Field of Classification Search ............ None
See application file for complete search history.

(56) References Cited

U.S. PATENT DOCUMENTS

| | | | | |
|---|---|---|---|---|
| 4,917,366 A | * | 4/1990 | Murakami et al. | 270/58.09 |
| 5,768,677 A | * | 6/1998 | Natsume | 399/376 |
| 5,905,935 A | * | 5/1999 | Wakamatsu et al. | 399/407 |
| 6,542,257 B2 | * | 4/2003 | Kutsuwada et al. | 358/1.18 |
| 6,704,527 B2 | * | 3/2004 | Asai | 399/82 |
| 2002/0051206 A1 | | 5/2002 | Kazunori | |
| 2003/0227652 A1 | | 12/2003 | Kazunori | |
| 2005/0187088 A1 | * | 8/2005 | Tsukuba et al. | 493/384 |
| 2005/0207812 A1 | * | 9/2005 | Miyazaki | 399/407 |

FOREIGN PATENT DOCUMENTS

| | | | |
|---|---|---|---|
| EP | 608685 A1 | * | 8/1994 |
| JP | 5-119556 | | 5/1993 |
| JP | 2000-092307 | | 3/2000 |
| JP | 2000-141793 | | 5/2000 |
| JP | 2000141793 A | * | 5/2000 |
| JP | 2001211309 A | * | 8/2001 |
| JP | 2001230926 A | * | 8/2001 |
| JP | 2002127634 A | * | 5/2002 |
| JP | 2002-232677 | | 8/2002 |
| JP | 2003-020163 | | 1/2003 |
| JP | 2003101748 A | * | 4/2003 |

OTHER PUBLICATIONS

Oct. 4, 2005 official Communication and European Search Report in connection with European Application No. EP 05 00 5864 which corresponds to the above-identified application.

* cited by examiner

*Primary Examiner*—Daniel J. Colilla
*Assistant Examiner*—'Wynn' Q Ha
(74) *Attorney, Agent, or Firm*—Cooper & Dunham, LLP

(57) ABSTRACT

An image forming device comprises an image-processing unit which performs a predetermined image processing of an input image data. An output unit prints an image on a copy sheet based on the image data after the image processing. A Z-folding device is connected to the output unit and performs a Z folding of the copy sheet. A control unit controls the image-processing unit and the Z-folding device so that the image data is rotated in a direction conforming to a Z-folding direction specified by a user, and the Z folding of the copy sheet is controlled with the rotated image data.

10 Claims, 6 Drawing Sheets

CONVEYANCE DIRECTION →

1ST PAGE     2ND PAGE            1ST PAGE     2ND PAGE

→

IMAGE FORMING APPARATUS, IMAGE PROCESSING METHOD, PROGRAM AND RECORDING MEDIUM

BACKGROUND

1. Technical Field

The present disclosure relates to an image forming apparatus, an image processing method, a program and a recording medium, and more particularly to an image forming apparatus, such as a laser beam printer, a digital copier or a digital multi-function peripheral, that is equipped with the Z-folding device.

2. Description of the Related Art

In recent years, with the spreading of the computers and the printers, abundant document data are created individually. And the sheet forms of various sizes, such as A4, A3, B4, and B5, are used for printing the created data.

To bind up the two or more sheets of such various sizes carrying the printed data into one volume, it is necessary that the sheets of the reference size are set up, the sheets of the size larger than the reference size are folded to match the reference size, and the punch holes are formed and the staplers are fastened.

On the other hand, Japanese Laid-Open Patent Application No. 2003-020163 discloses the Z folding mechanism in which the sheet folding position can be easily changed and the sheets are folded certainly at the desired folding position.

Moreover, Japanese Laid-Open Patent Application No. 2000-141793 discloses the print card creation device which uses the roll in which the continuous paper extending in the direction of the length and having the fixed width is wounded around the cylindrical core, and forms the image on the card-like medium such as the greeting card. With the print card creation device, the print card suitable for the double folding or triple folding can be provided.

Moreover, Japanese Laid-Open Patent Application No. 2000-092307 discloses the image processing device in which the size of the output sheet form and the folding setting are inputted, the position of the folding line or frame is set up based on the input folding setting, and the size of the output image and/or the arrangement of the folding are set up based on the line or the frame.

In the conventional Z-folding device described above, only the folding of the sheet sizes A3 and B4 is possible and all the sheets in which the sheet feeding is possible are folded. However, when the printing is performed with the sheets of various sizes, or when the copy sheets of various sizes in which the data is printed are created, the user is not uncertain at which position the sheets being printed or copied are folded, where the punch holes or the staplers are formed, and in which direction the paper is delivered.

SUMMARY

In an aspect of the present disclosure an image forming apparatus with which the user can easily specify the folding direction with respect to the direction of the image being printed is provided.

In another aspect of the present disclosure, an image processing method in which the folding direction can be specified in the easy-to-use manner is provided.

In another aspect, an image forming apparatus is provided which comprises an image-processing unit performing a predetermined image processing of an input image data, an output unit printing an image on a copy sheet based on the image data after the image processing, a Z-folding device connected to the output unit and performing a Z folding of the copy sheets, and a control unit controlling the image-processing unit and the Z-folding device so that the image data is rotated in a direction conforming to a Z-folding direction specified by a user, and the Z folding of the copy sheet is controlled with the rotated image data.

In another aspect, the present disclosure provides an image processing method for use in an image forming apparatus including an image-processing unit, an output unit, and a Z-folding device connected to the output unit, wherein the image processing method comprises performing a predetermined image processing of an input image data, performing a Z folding of the copy sheet, and controlling the image-processing unit and the Z-folding device so that the image data is rotated in a direction conforming to a Z-folding direction specified by a user, and the Z folding of the copy sheet is controlled with the rotated image data.

By utilizing the approach described herein, the user can easily specify the Z folding direction with respect to the direction of the image being printed. Thus, the Z folding direction can be specified in an easy-to-use manner.

BRIEF DESCRIPTION OF THE DRAWINGS

Other, features and advantages of the subject matter of the present disclosure will be apparent from the following detailed description when read in conjunction with the accompanying drawings.

DETAILED DESCRIPTION OF PREFERRED EMBODIMENTS

A description will now be given of the preferred embodiments of the invention with reference to the accompanying drawings.

Figure 1:
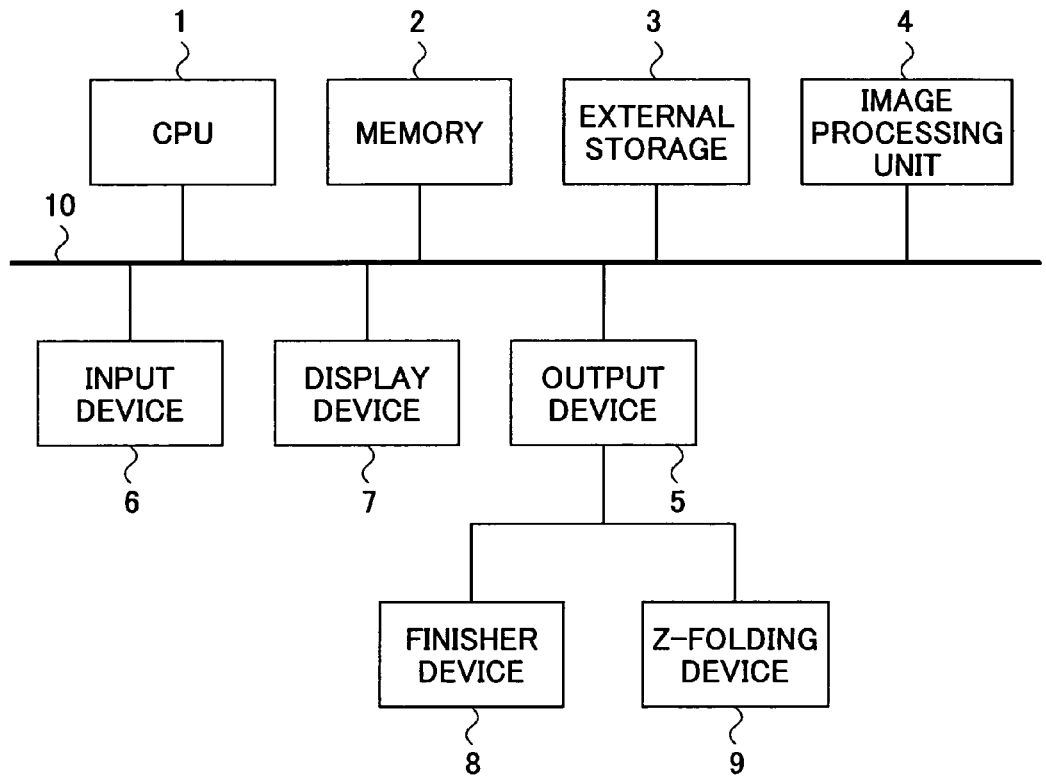
FIG. 1 is a block diagram showing the composition of an image forming apparatus in a preferred embodiment of the present disclosure.

FIG. 1 shows the composition of the image forming apparatus in the preferred embodiment of the invention.

As shown in FIG. 1, the image forming apparatus comprises the CPU (central processing unit) 1 which controls operation of this image forming apparatus according to the program which is stored in the external storage 3 of the image forming apparatus and loaded to the memory 2 at the time of execution.

The image forming apparatus comprises the memory 2 for storing the image data for the display device 7, the printing image data processing, the image data for the working of the image processing, etc.

The image forming apparatus comprises the external storage 3 for storing the program, the data for performing the program, and the data under the execution. The image forming apparatus comprises the output device (the image formation unit) 5 which prints the image on the copy sheet based on the image data in which the image processing is carried out. The image forming apparatus comprises the image-processing unit 4 which performs various kinds of processings for the image data.

These components of the image forming apparatus are interconnected by the bus 10.

Moreover, the input device 6 which inputs the data, the command, etc. to the CPU 1, and the display device 7 which displays the various kinds of inputs, the results, the warning, etc. are connected to the bus 10.

Moreover, the output device 5 is equipped with the Z-folding device 9 and the finisher device 8. The Z folding device 9 folds the copy sheet in the Z-shaped manner, and the finisher device 8 fastens the staples to or forms the punch holes in the copy sheet. Alternatively, the finisher device 8 and the Z-folding device 9 may be provided in a part of the image forming apparatus or in the post-processing device which constitutes a part of the image forming apparatus.

The finisher device 8, the Z-folding device 9, and the Z folding which are the prerequisites for the following explanation will be explained.

Figure 2:
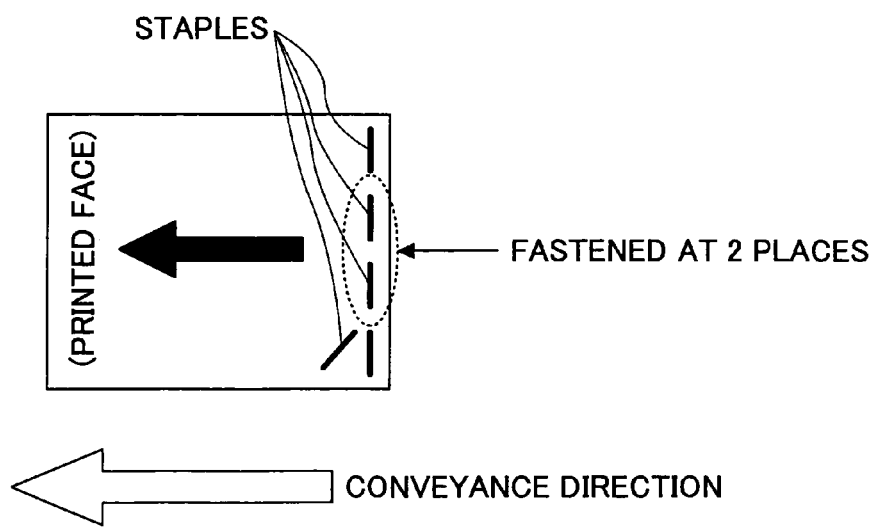
FIG. 2 is a diagram for explaining the staple possible position which is assumed in the preferred embodiment of the invention.
Figure 3:
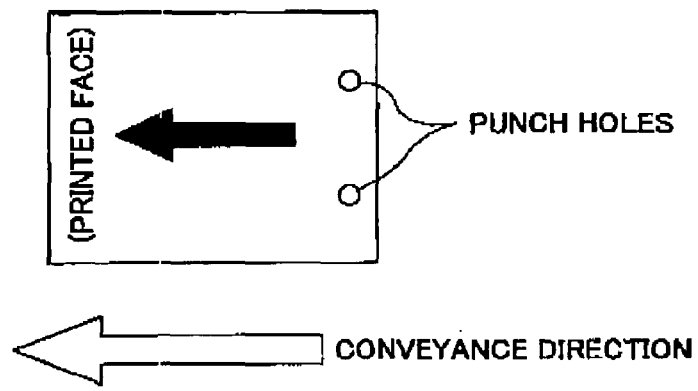
FIG. 3 is a diagram for explaining the punch possible position which is assumed in the preferred embodiment of the invention.

The finisher device 8 (which may be integrally formed with the Z-folding device 9) is capable of forming the staples or the punch holes at the rear end portions of the copy sheet in the conveyance direction of the copy sheet as shown in FIG. 2 and FIG. 3. The staples and the punch holes can be formed for each of the SEF (Short Edge Feed; the copy sheet is conveyed in the direction such that the copy sheet short edge becomes the front edge) mode and the LEF (Long Edge Feed; the copy sheet is conveyed in the direction such that the copy sheet long edge becomes the front edge) mode.

The image forming apparatus of this embodiment is provided so that passing through the output device 5 the copy sheet having a width larger than the width of the long edge of the copy sheet of A4 size in the LEF mode is not allowed. The image forming apparatus of this embodiment is provided so that passing through the output device 5 the copy sheets of B4 size and A3 size is allowed only in the SEF mode.

Figure 4A:
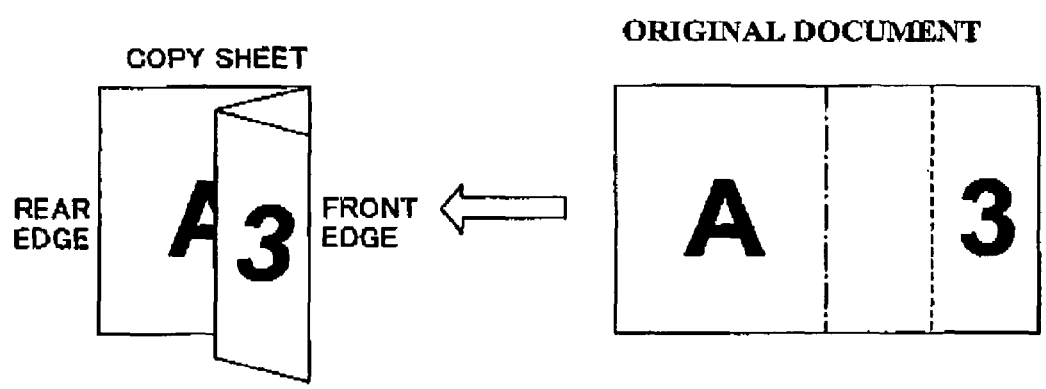
FIG. 4A and FIG. 4B are diagrams for explaining the Z folding and the Z folding direction which are defined according to the preferred embodiment.
Figure 4B:
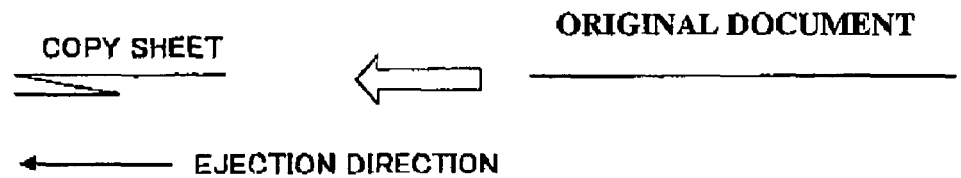

The Z-folding device 9 is capable of performing the Z folding of the copy sheet in which the front-end portion of the copy sheet in the conveyance direction is folded in the Z-shaped manner as shown in FIG. 4B. The image forming apparatus of this embodiment is provided so that the Z folding is allowed for only the three kinds (A4, B4 and A3) of the sheet size of the copy sheet when the copy sheet conveyance is in the SEF mode.

The Z folding in this example is performed as shown in FIG. 4A by folding down the copy sheet along the centerline of the copy sheet in the conveyance direction and further folding down the half portion of the copy sheet along the first quarter line of the copy sheet in the conveyance direction.

Figure 5A:
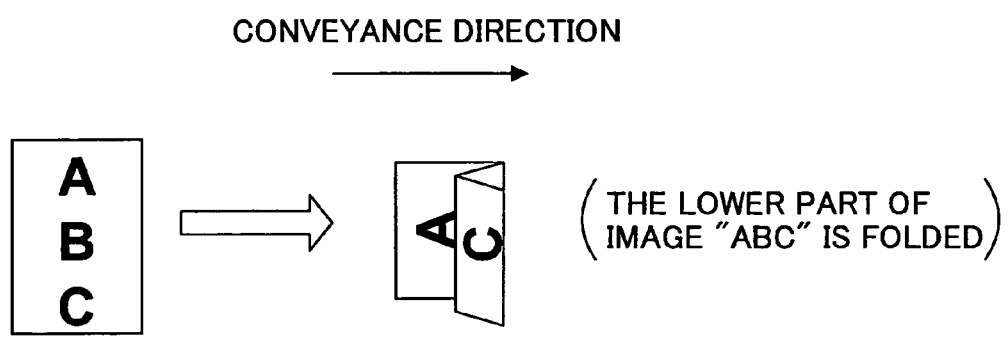
FIG. 5A and FIG. 5B are diagrams for explaining the definition of the bottom folding and the right side folding.
Figure 5B:
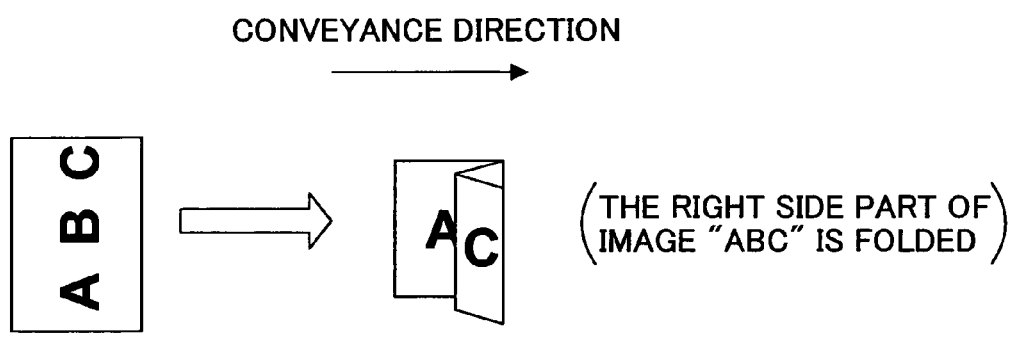

As for the output device 5 equipped with the Z-folding device 9, the "bottom folding" (see FIG. 5A) is defined as being the way of folding the copy sheet in which the bottom-end portion of the copy sheet with respect to the image transferred to the sheet is folded. It is supposed in this case that the copy sheet is the first page. The "right side folding" (see FIG. 5B) is defined as being the way of folding the copy sheet in which the right-end portion of the copy sheet with respect to the image transferred to the sheet is folded. Similarly, the "top folding" and the "left side folding" are also defined as being the way of folding the copy sheet in the directions opposite to those of the "bottom folding" and the "right side folding", respectively.

The image forming apparatus receives the image data from the host computer in the printing buffer of the memory 2, and develops the received image data of the printing buffer to the printing image data.

In the image-processing unit 4, the printing image data is acquired from the image data of the printing buffer of the memory 2, so that the image processing of the printing image data is performed. The image processing unit 4 performs the DMA data transfer of the printing image data after the image processing to the optical writing unit of the output device 5.

After the image information is optically written to the photoconductor (which is not illustrated) by the optical writing unit to form the electrostatic latent image thereon, this electrostatic latent image is formed into the visible image with the toner. This toner image is transferred to the copy sheet, and it is fixed to the copy sheet so that the printing is carried out.

When the output device 5 is the image forming unit of the electrophotographic printing type, the output device 5 is equipped with the optical writing unit, the photoconductor, the charging unit, the transferring unit, and the fixing unit. When the output device 5 is the recording unit of the ink jet printing type or others, the output device 5 performs the printing according to the printing signal.

In the present embodiment, if the user specifies the Z-folding direction (any of the bottom folding, the right side folding, the top folding, or the left side folding) using the input device 6, the CPU 1 controls the image-processing unit 4 so that the image data of the printing buffer is rotated in the direction conforming to the specified Z-folding direction, and the image data created after the rotation is transferred to the output device 5.

Alternatively, the CPU 4 may be configured so that the printing image data after the development is transferred to the output device 5, and the output device 5 is controlled so that the printing image data is rotated in the direction conforming to the specified Z-folding direction while the rotated image data is printed to the copy sheet.

Furthermore, if the Z-folding direction specified by the user is known before the image data received from the host computer in the printing buffer is developed, the CPU 1 may be configured so that the received image data is developed in the printing buffer in the direction conforming to the specified Z-folding direction beforehand such that it is not necessary to rotate the image data when writing it to the printing buffer.

If the image forming apparatus is capable of automatically selecting the paper tray when printing the image data rotated in the direction conforming to the specified Z-folding direction, the image forming apparatus detects whether there is the paper tray containing the copy sheets conforming to the sheet size and the direction of the image data being printed. When there is the conforming paper tray, the image forming apparatus selects the paper tray and carries out the printing with the selected paper tray. Thereby, the copy sheet with which the printing and the specified Z folding can be performed is chosen.

On the other hand, when there is no paper tray which conforms to the sheet size and the direction of the image data being printed, or when there is the conforming paper tray but the paper tray contains no copy sheet, the alert indication is displayed on the display device 7 so that the user is requested to exchange the paper tray or supplement the copy sheets.

Furthermore, when the copy sheet of the paper tray specified by the user is not the copy sheet with which the Z folding can be performed in the specified direction, the alert display etc. is displayed on the display device 7 so that the user is requested to exchange the paper tray.

The image forming apparatus of the present embodiment performs the above-described operation to each copy sheet for all the pages of the document.

However, when the sheet size of the copy sheet for printing the image data rotated in the direction conforming to the specified Z folding direction is improper for the feeding of the copy sheet (for example, when the portrait mode of the copy sheet of A3 size and the right side folding are specified), the image forming apparatus of the present embodiment is provided so that the Z folding is not performed and the printing is performed without rotating the image data.

Moreover, when the sheet size of the copy sheet for printing the image data rotated in the direction conforming to the specified Z folding direction is improper for the Z folding, the image forming apparatus of the present embodiment is provided so that the Z folding is not performed for the copy sheet. It is not necessary to determine whether the rotation of the image data should be performed in such a case, and the determination may be made depending on the priority of the automatic tray selection etc.

Next, the control procedure which is performed by the image forming apparatus of the present embodiment will be explained using FIG. 6.

Figure 6:
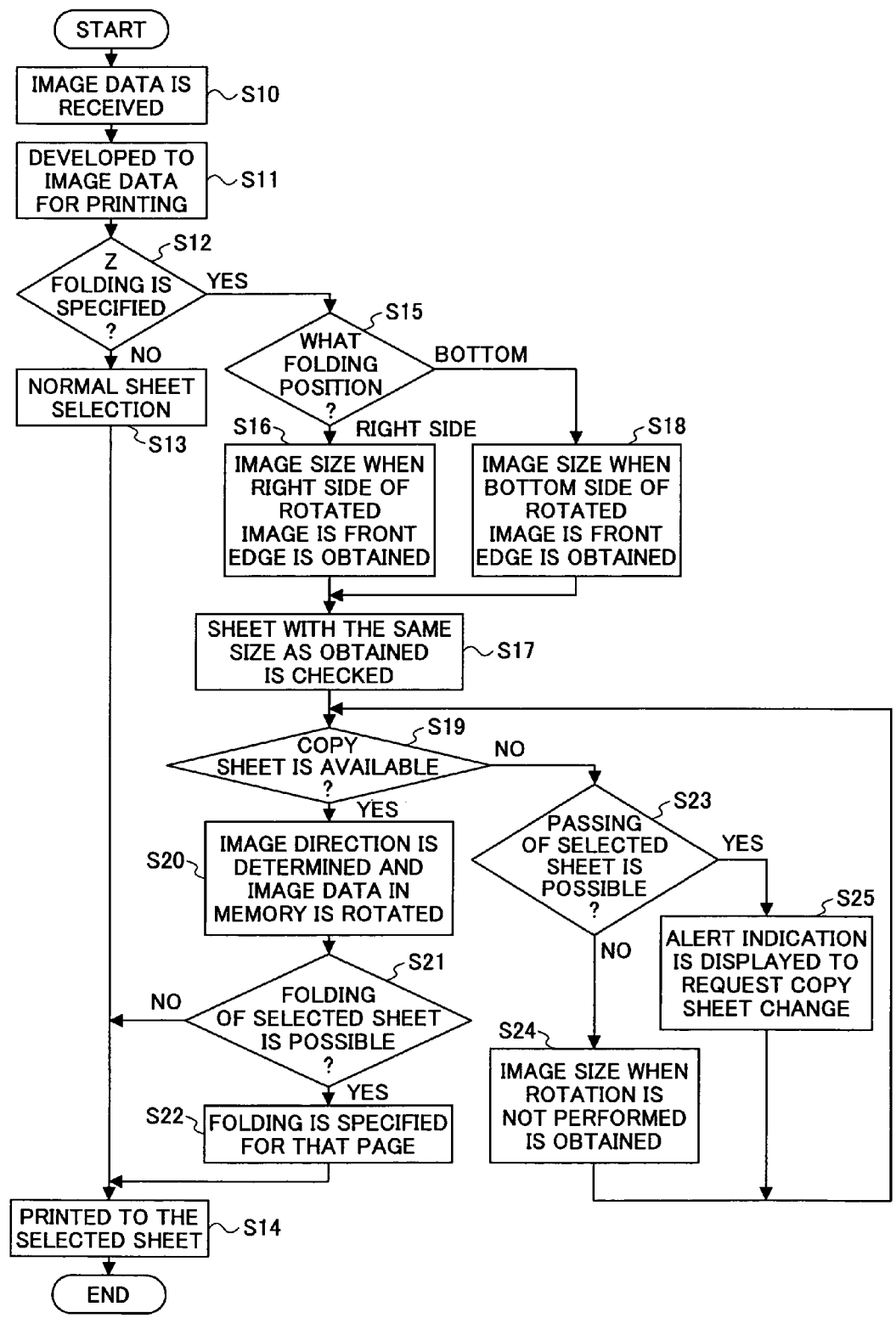
FIG. 6 is a flowchart for explaining the control procedure which is performed by the image forming apparatus of the present embodiment.

In the procedure of FIG. 6, the CPU of the image forming apparatus receives the image data from the host computer in the printing buffer of the memory 2 (step S10), and develops the received image data of the printing buffer of the memory 2 to the printing image data (step S11).

In step S12, the CPU determines whether the user specifies the Z folding direction using the input device 6.

When the user does not specify the Z-folding direction using the input device 6 (NO of step S12), the CPU controls the image-processing unit 4 so that the DMA data transfer of the printing image data to the optical writing unit of the output device 5 is performed, and controls the output device 5 so that the normal sheet selection is performed (step S13). The CPU controls the output device 5 so that the printing is performed with the copy sheet from the selected paper tray (step S14).

On the other hand, when the user specifies the Z-folding direction using the input device 6 (YES of step S12), the CPU determines whether the specified Z folding direction is the right side folding or the bottom folding (step S15).

When the specified Z folding direction is the right side folding ("right" of step S15), the CPU obtains the size of the image data when the image is rotated in the direction such that the right edge of the image printed on the sheet becomes the front edge in the conveyance direction of the copy sheet (step S16).

When the specified Z folding direction is the bottom folding ("bottom" of step S15), the CPU obtains the size of the image data when the image is rotated in the direction such that the bottom edge of the image printed on the sheet becomes the front edge in the conveyance direction of the copy sheet (step S18).

After step S16 or step S18 is performed, the CPU checks the paper tray of the copy sheet having the size that is the same as the sheet size obtained (step S17). After step S17 is performed, the control is transferred to step S19.

In step S19, the CPU determines whether there is the paper tray of the copy sheet having the same size.

When there is the paper tray (YES of step S19), the CPU controls the image processing unit 4 so that the direction of the image is determined and the image data of the image buffer is actually rotated in the direction determined (step S20).

In the case where step S20 is performed after step S16 or step S18 is performed, the image data is actually rotated in the direction conforming to the specified Z-folding direction. However, in the case where step S20 is performed after step S24 is performed, the image data is not rotated since the direction of the image remains unchanged.

In step S21, the CPU determines whether the Z folding is allowed for the copy sheet of the paper tray detected at step S17.

When the Z folding is allowed for the copy sheet of the paper tray detected (YES of step S21), the CPU specifies the Z folding to the corresponding page of the copy sheet (step S22). The DMA data transfer of the image data rotated is carried out to the optical writing unit of the output device 5, and the printing and the Z folding will be carried out with the copy sheet of the selected paper tray (step S14).

On the other hand, when there is no paper tray (NO of step S19), the CPU determines whether the sheet feeding is allowed for the sheet size obtained at step S16 or step S18 (step S23).

When the sheet feeding is not allowed (NO of step S23), the CPU checks the paper tray of the sheet size which allows the printing of the image which is not rotated (step S24). After step S24 is performed, the control is transferred to step S19.

On the other hand, when the sheet feeding is allowed (YES of step S23), the CPU controls the display device 7 so that the alert indication is displayed on the display device 7 so that the user is requested to exchange the paper tray or supplement the copy sheet (step S25). After the exchange of the paper tray or the supplement of the copy sheet is performed by the user, the control is transferred to step S19.

According to the above-described control procedure, the user can easily specify the folding direction with respect to the direction of the image being printed. It is possible to provide the image processing method in which the folding direction can be specified in the easy-to-use manner.

Moreover, the direction of the image conforming to the Z folding direction is determined, the copy sheet according to the direction determined is selected, and the image is rotated. It is possible to easily carry out the Z folding in the direction as specified by the user.

Moreover, the image forming apparatus of the present embodiment can carry out the folding and the printing certainly by rotating the image for each page in the direction conforming to the specified folding direction. At this time, when it does not conform to the folding position and the direction of the image, the copy sheet is ejected without being folded. It is possible to prevent the folding inconvenient for the user from being performed.

Next, the cases where the copy sheets of different paper sizes, such as A4/A3 and A5/A4, are printed will be explained.

For example, when the printing is performed with the mixed copy sheets of A4/A3 sizes, the copy sheet of A4 size is printed in the LEF mode, and the Z folding and the printing is performed for the copy sheet of A3 size so as to match with the A4 size, so that the output is suitable for the post-processing, the filing, etc. (the staples and the punch). At this time, the user can specify the folding direction with respect to the image direction of the first page, so that the printing of the mixed-loading document can be carried out correctly.

Figure 7:
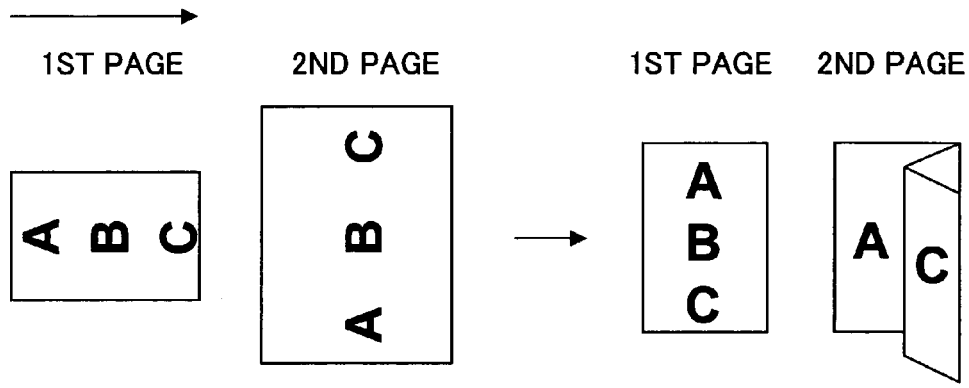
FIG. 7 is a diagram for explaining the case where the A4 size and the portrait mode are specified for the 1st page, the A3 size and the landscape mode are specified for the 2nd page, and the right side folding is specified.

For example, the case where the A4 size and the portrait mode are specified for the 1st page, the A3 size and the landscape mode are specified for the 2nd page, and the right side folding is specified is considered (see FIG. 7).

In this case, it is required that the Z folding is performed only at the front-end portion in the conveyance direction. The image is rotated in the direction such that the right-hand side of the rotated image becomes the front edge in the conveyance direction. Therefore, the copy sheet of A4 size will be used in the LEF mode. In this case, the 1st page is the A4 portrait mode, and the image in which the copy sheet is set in the LEF mode is created.

However, the Z-folding device 9 of the present embodiment is not capable of performing the Z folding of the A4 size copy sheet in the LEF mode, and the printing is performed without folding the copy sheet.

Next, for the 2nd or subsequent page, the image is rotated so that it has the same width and the same direction as those of the 1st page. In this case, the image of the 2nd page in the A3 landscape mode must be created, and the copy sheet is conveyed in the SEF mode. The sheet feeding is allowed for the size of the image created, and the printing and the Z folding are performed.

Moreover, the case where the A4 size and the portrait mode are specified for the $1^{st}$ page, the A3 size and the portrait mode are specified for the $2^{nd}$ page, and the bottom folding is specified is considered.

Similar to the above case, in this case, the 1st page is the A4 portrait mode, and the image in which the copy sheet is set in the LEF mode (the copy sheet long edge becomes the front edge in the conveyance direction) is created.

Next, for the 2nd or subsequent page, the image is rotated counterclockwise by 90 degrees so that it has the same width as that of the 1st-page image. If the Z folding is allowed for the size of the rotated image, the printing and the Z folding are performed. If the Z folding is not allowed, the printing is performed without performing the Z folding.

Figure 8:
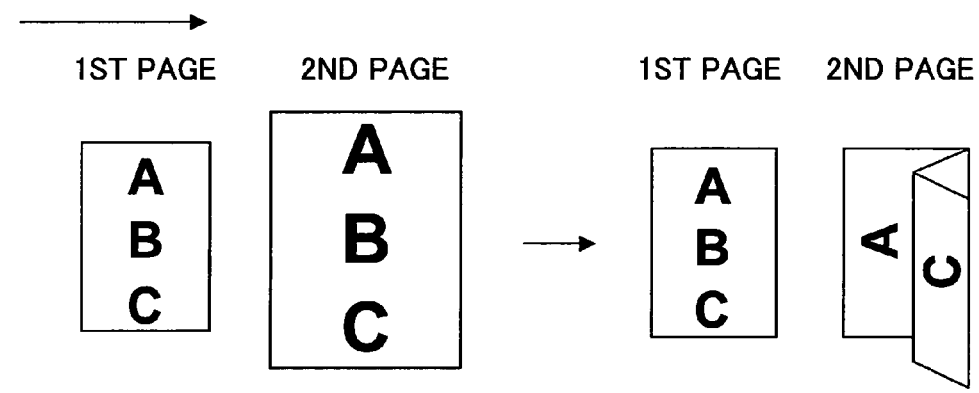
FIG. 8 is a diagram for explaining the case where the A4 size and the portrait mode are specified for the $1^{st}$ page, the A3 size and the portrait mode are specified for the $2^{nd}$ page, and the bottom folding is specified.

In the case of FIG. 8, the direction of the 1st-page image and the direction of the 2nd-page image are not set such that they can be read from the same direction. In such a case, the printing is performed by rotating the 2nd-page image in the direction conforming to the predetermined relation with respect to the 1st page image. Specifically, in this case, the 2nd-page image is rotated counterclockwise by 90 degrees to the direction of the 1st-page image.

Figure 9:
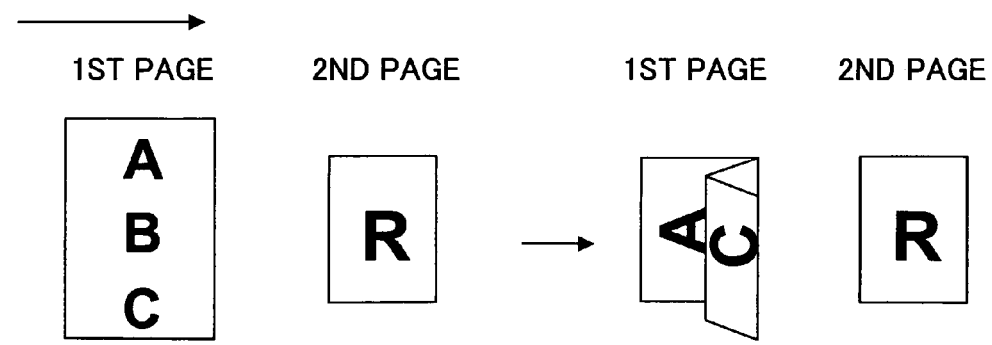
FIG. 9 is a diagram for explaining the case where the A4 size and the portrait mode are specified for the 1st page, the A5 size and the portrait mode are specified for the 2nd page, and the bottom folding is specified.

Moreover, the case where the A4 size and the portrait mode are specified for the 1st page, the A5 size and the portrait mode are specified for the 2nd page, and the bottom folding is specified is considered (see FIG. 9).

Similar to the above case, in this case, the 1st page is the A4 portrait mode and the bottom folding is specified, and the 1st-page image is rotated in the direction such that the bottom edge of the 1st-page image rotated becomes the front edge. Since the Z folding is allowed for the size of the 1st-page image rotated, the printing and the Z folding are performed.

As for the 2nd or subsequent page, the image is rotated so that it has the same width as that of the 1st-page image, and the copy sheet of A5 size in the LEF mode is selected. Since the Z folding is not allowed for the copy sheet of A5 size in the LEF mode, and the printing is performed without folding the copy sheet of A5 size.

Therefore, according to the present embodiment, the stacking of the mixed-size copy sheets can be correctly carried out in accordance with the following rules.

(1) The image of the first page is rotated in the direction conforming to the specified Z folding direction by the image-processing unit, such that the right-side or bottom edge of the image rotated, conforming to the specified Z folding direction, becomes the front edge in the conveyance direction.

(2) The second or subsequent page image is rotated so that it may have the same width as that of the first-page image.

(3) The printing and the Z folding are performed when the Z folding is allowed for the size of the image, and when the Z folding is not allowed, the printing is performed without performing the Z folding.

Next, the case where the Z-folding as specified is not allowed for the copy sheet of the 1st page is considered.

In the Z-folding device 9 of the present embodiment, if the A3 portrait mode and the right side folding are specified, the specified Z-folding direction is allowed but the sheet feeding is nor allowed. Moreover, if the A5 portrait mode and the bottom folding are specified, the Z folding is not allowed for the size of the copy sheer of the first page. Also the Z folding is not allowed for the copy sheets of the same size and different widths. In addition, when there is no paper tray containing copy sheets of a size that matches with a size of the image data rotated in the direction conforming to the specified Z-folding direction, direction printing is suspended.

In such a case, the printing is suspended, and an error message indicating that the specified folding direction is incorrect is displayed on the display device 7 so that the user is requested to specify the Z folding direction again.

Next, the variation of the control procedure which is performed by the image forming apparatus of the present embodiment will be explained using FIG. 10.

Figure 10:
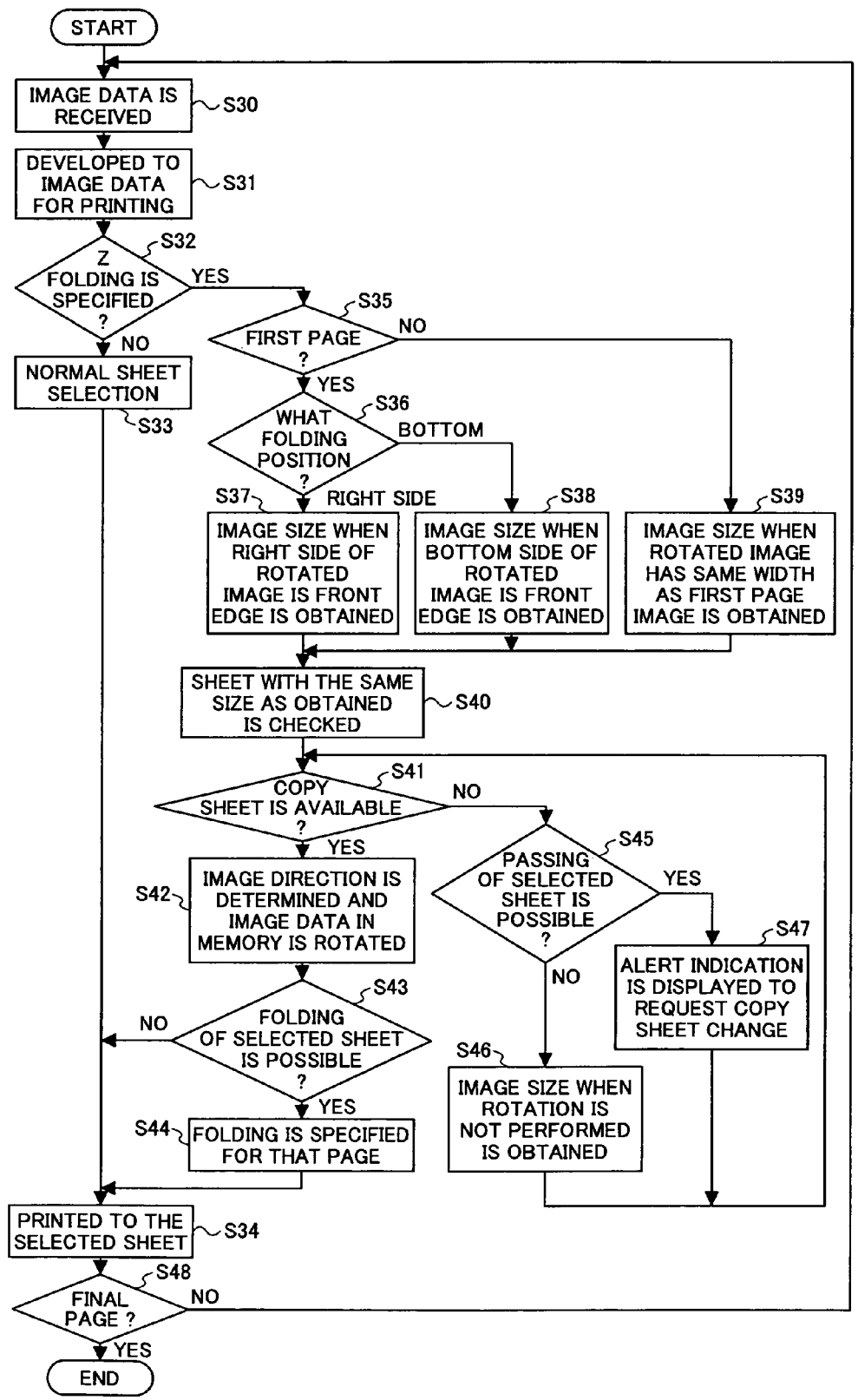
FIG. 10 is a flowchart for explaining the variation of the control procedure which is performed by the image forming apparatus of the present embodiment.

In the procedure of FIG. 10, the CPU of the image forming apparatus receives the image data of one page from the host computer in the printing buffer of the memory 2 (step S30), and develops the received image data of the printing buffer of the memory 2 to the printing image data (step S31).

Next, the CPU determines whether the user specifies the Z folding direction using the input device 6 (step S32). When the user does not specify the Z-folding direction using the input device 6 (NO of step S32), the CPU controls the image-processing unit 4 so that the DMA data transfer of the printing image data to the optical writing unit of the output device 5 is performed, and controls the output device 5 so that the normal sheet selection is performed (step S33). The CPU controls the output device 5 so that the printing is performed with the copy sheet from the selected paper tray (step S34).

On the other hand, when the user specifies the Z-folding direction using the input device 6 (YES of step S32), the CPU determines whether the received image data is the first page (step S35).

When the received image data is the first page (YES of step S35), the CPU determines whether the specified Z folding direction is the right side folding or the bottom folding (step S36).

When the specified Z folding direction is the right side folding ("right" of step S36), the CPU obtains the size of the image data when the image is rotated in the direction such that the right edge of the image printed on the sheet becomes the front edge in the conveyance direction of the copy sheet (step S37). The control progresses to step S40.

When the specified Z folding direction is the bottom folding ("bottom" of step S36), the CPU obtains the size of the image data when the image is rotated in the direction such that the bottom edge of the image printed on the sheet becomes the front edge in the conveyance direction of the copy sheet (step S38). The control progresses to step S40.

When the received image data is not the first page (NO of step S35), the CPU obtains the image size when the image is rotated such that the rotated image has the width that is the same as the width of the first-page image (step S39). The control progresses to step S40.

After any of steps S37 to S39 is performed, the CPU checks the paper tray of the copy sheet having the size that is the same as the sheet size obtained (step S40). After step S40 is performed, the control is transferred to step S41.

In step S41, the CPU determines whether there is the paper tray of the copy sheet having the same size.

When there is the paper tray (YES of step S41), the CPU controls the image processing unit 4 so that the direction of the image is determined and the image data of the image buffer is actually rotated in the direction determined (step S42).

In the case where step S42 is performed after step S37 or step S38 is performed, the image data is actually rotated in the direction conforming to the specified Z-folding direction. However, in the case where step S42 is performed after step S46 is performed, the image data is not rotated since the direction of the image remains unchanged.

In step S43, the CPU determines whether the Z folding is allowed for the copy sheet of the paper tray detected at step S40.

When the Z folding is allowed for the copy sheet of the paper tray detected (YES of step S43), the CPU specifies the Z folding to the corresponding page of the copy sheet (step S44). The DMA data transfer of the image data rotated is carried out to the optical writing unit of the output device 5, and the printing and the Z folding will be carried out with the copy sheet of the selected paper tray (step S34).

On the other hand, when there is no paper tray (NO of step S41), the CPU determines whether the sheet feeding is allowed for the sheet size obtained at any of steps S37 to S39 (step S45).

When the sheet feeding is not allowed (NO of step S45), the CPU checks the paper tray of the sheet size which allows the printing of the image which is not rotated (step S46). After step S46 is performed, the control is transferred to step S41.

On the other hand, when the sheet feeding is allowed (YES of step S45), the CPU controls the display device 7 so that the alert indication is displayed on the display device 7 so that the user is requested to exchange the paper tray or supplement the copy sheet (step S47). After the exchange of the paper tray or the supplement of the copy sheet is performed by the user, the control is transferred to step S41.

After step S34 is performed, the CPU determines whether the received image data is the final page (S48). When the received image data is not the final page, the control is transferred to the above S30 and the same procedure is repeated and performed. When it is the final page, the procedure of FIG. 10 is finished.

According to the above-mentioned control procedure, the user can easily specify the folding direction with respect to the direction of the first-page image being printed. It is possible to provide the image processing method in which the folding direction can be specified in the easy-to-use manner.

Moreover, it is possible to provide the image processing method in which the output which meets with the sheet size specified by the user can be offered by arranging the width of the copy sheet to choose.

Moreover, it is possible to provide the image processing method in which the output which meets the final sheet size specified by the user can be offered only by determining whether the Z folding is allowed for the size of the image. At this time, when the sheet feeding is not allowed for the folding direction, the undesired consumption of the copy sheet can be prevented by suspending the printing and the folding.

It is a matter of course that each function which constitutes the preferred embodiment mentioned above can be programmed respectively, the program can be recorded in the recording medium, such as a ROM, beforehand, the image forming apparatus can be provided with the ROM, and the program that achieves the objective of the invention can be executed.

In such embodiment, the function of the preferred embodiment which the program itself read from the recording medium mentioned above will be realized, and the recording medium which recorded the program and its program will also constitute the present invention.

In addition, as a recording medium which stores the program, it is possible to use any of the semiconductor media (for example, ROM, non-volatile memory, etc.), the optical media (for example, DVD, MO, MD, CD, etc.), and the magnetic media, (for example, the magnetic tape, the flexible disk, etc.).

Or the program stored in the server storage device connected through the network may be made to be supplied directly. In such embodiment, the server storage device is also contained in the recording medium of the present invention.

Moreover, it is contained when the function of the preferred embodiment mentioned above by the function of the preferred embodiment mentioned above by performing the loaded program is not only realizing, but processing in collaboration with the operating system or other application programs based on the instructions of the program is realized. Thus, the cost effectiveness, the portability, and the versatility can be raised by programming the function of the preferred embodiment and distributing the recording medium.

The present invention is not limited to the above-described embodiments, and variations and modifications may be made without departing from the scope of the present invention.

Further, the present application is based on and claims the benefit of priority of Japanese patent application No. 2004-077918, filed on Mar. 18, 2004, the entire contents of which are hereby incorporated by reference.

What is claimed is:

1. An image forming apparatus comprising:
an image-processing unit performing a predetermined image processing of an input image data;
an output unit printing an image on a copy sheet based on the image data after the image processing;
a Z-folding device connected to the output unit and performing a Z folding of the copy sheet; and
a control unit controlling the image-processing unit and the Z-folding device so that the image data is rotated in a rotation direction conforming to a Z-folding direction specified by a user, and the Z folding of the copy sheet is controlled with the rotated image data,
wherein said rotation direction is one of clockwise by 90 degrees and counterclockwise by 90 degrees, and
wherein the control unit is provided so that, when passing of the copy sheet through the output unit is not allowed for a size of the image data rotated in the rotation direction conforming to the specified Z-folding direction, the rotation of the image data is canceled and the image is printed on the copy sheet without performing the Z folding.

2. The image forming apparatus according to claim 1, wherein the control unit selects a paper tray containing copy sheets of a size that matches with a size of the image data rotated in the rotation direction conforming to the specified Z-folding direction.

3. The image forming apparatus according to claim 1, wherein the Z-folding direction specified by the user is applied to each of a plurality of copy sheets.

4. The image forming apparatus according to claim 1, wherein the control unit is provided so that, when the printing of a plurality of images of different sizes is performed continuously, the image data is rotated in a rotation direction conforming to a Z-folding direction specified by the user for a first-page image of the plurality of images.

5. The image forming apparatus according to claim 4 wherein the control unit is provided so that image data of a second or subsequent image of the plurality of images is rotated such that the rotated image data has a width which is equal to a width of the first-page image.

6. An image forming apparatus comprising:
an image-processing unit performing a predetermined image processing of an input image data;
an output unit printing an image on a copy sheet based on the image data after the image processing;
a Z-folding device connected to the output unit and performing a Z folding of the copy sheet; and
a control unit controlling the image-processing unit and the Z-folding device so that the image data is rotated in a rotation direction conforming to a Z-folding direction specified by a user, and the Z folding of the copy sheet is controlled with the rotated image data,
wherein said rotation direction is one of clockwise by 90 degrees and counterclockwise by 90 degrees,
wherein the control unit is provided so that, when the printing of a plurality of images of different sizes is performed continuously, the image data is rotated in a rotation direction conforming to a Z-folding direction specified by the user for a first-page image of the plurality of images,
wherein the control unit is provided so that image data of a second or subsequent image of the plurality of images is rotated such that the rotated image data has a width which is equal to a width of the first-page image, and
wherein the control unit is provided so that the printing and the Z folding are performed when the Z folding is allowed for a size of the rotated image data, and the printing is performed without performing the Z folding when the Z folding is not allowed.

7. An image forming apparatus comprising:
an image processing unit performing a predetermined image processing of an input image data;
an output unit printing an image on a copy sheet based on the image data after the image processing;
a Z-folding device connected to the output unit and performing a Z folding of the copy sheet; and
a control unit controlling the image-processing unit and the Z-folding device so that the image data is rotated in a rotation direction conforming to a Z-folding direction specified by a user, and the Z folding of the copy sheet is controlled with the rotated image data,
wherein said rotation direction is one of clockwise by 90 degrees and counterclockwise by 90 degrees, and
wherein the control unit is provided so that, when the printing of a plurality of images of different sizes is performed continuously, the image data is rotated in a rotation direction conforming to a Z-folding direction specified by the user for a first-page image of the plurality of images; and
wherein the control unit is provided so that, when there is no paper tray containing copy sheets of a size that matches with a size of the image data rotated in the rotation direction conforming to the specified Z-folding direction, the printing is suspended and an error message indicating that the folding direction specified is incorrect is displayed.

8. An image-processing method for use in an image forming apparatus including an image-processing unit, an output unit, and a Z-folding device connected to the output unit, the image processing method comprising the step of:
performing a predetermined image processing of an input image data;
performing a Z folding of the copy sheet; and
controlling the image-processing unit and the Z-folding device so that the image data is rotated in a rotation direction conforming to a Z-folding direction specified by a user, and the Z folding of the copy sheet is controlled with the rotated image data,
wherein said rotation direction is one of clockwise by 90 degrees and counterclockwise by 90 degrees, and
wherein when passing of the copy sheet through the output unit is not allowed for a size of the image data rotated in the rotation direction conforming to the specified Z-folding direction, the rotation of the image data is canceled and the image is printed on the copy sheet without performing the Z folding.

9. An image-processing method for use in an image forming apparatus including an image-processing unit, an output unit, and a Z-folding device connected to the output unit, the image processing method comprising the steps of:
performing a predetermined image processing of an input image data;
performing a Z folding of the copy sheet; and
controlling the image-processing unit and the Z-folding device so that the image data is rotated in a rotation direction conforming to a Z-folding direction specified by a user, and the Z folding of the copy sheet is controlled with the rotated image data,
wherein said rotation direction is one of clockwise by 90 degrees and counterclockwise by 90 degrees, and
wherein printing and the Z folding are performed when the Z folding is allowed for a size of the rotated image data, and the printing is performed without performing the Z folding when the Z folding is not allowed.

10. An image-processing method for use in an image forming apparatus including an image-processing unit, an output unit, and a Z-folding device connected to the output unit, the image processing method comprising the steps of:
performing a predetermined image processing of an input image data;
performing a Z folding of the copy sheet; and
controlling the image-processing unit and the Z-folding device so that the image data is rotated in a rotation direction conforming to a Z-folding direction specified by a user, and the Z folding of the copy sheet is controlled with the rotated image data,
wherein said rotation direction is one of clockwise by 90 degrees and counterclockwise by 90 degrees, and
wherein when there is no paper tray containing copy sheets of a size that marches with a size of the image data rotated in the rotation direction conforming to the specified Z-folding direction, the printing is suspended and an error message indicating that the folding direction specified is incorrect is displayed.

* * * * *